United States Patent
Ehrl et al.

(10) Patent No.: US 10,131,963 B2
(45) Date of Patent: Nov. 20, 2018

(54) PNEUMATIC NEEDLING DEVICE

(71) Applicant: MTU Aero Engines AG, Munich (DE)

(72) Inventors: Janne Ehrl, Munich (DE); Holger Polanetzki, Dachau (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 14/778,071

(22) PCT Filed: Apr. 5, 2014

(86) PCT No.: PCT/DE2014/000175
§ 371 (c)(1),
(2) Date: Sep. 17, 2015

(87) PCT Pub. No.: WO2014/177124
PCT Pub. Date: Nov. 6, 2014

(65) Prior Publication Data
US 2016/0108487 A1 Apr. 21, 2016

(30) Foreign Application Priority Data
Apr. 30, 2013 (DE) .......................... 10 2013 207 860

(51) Int. Cl.
*B25D 9/04* (2006.01)
*C21D 7/08* (2006.01)
(Continued)

(52) U.S. Cl.
CPC ................. *C21D 7/08* (2013.01); *B25D 9/02* (2013.01); *B23P 9/04* (2013.01);
(Continued)

(58) Field of Classification Search
CPC ... C21D 7/08; C21D 7/04; B25D 9/04; B25D 9/02; B25D 2250/221; B25D 2250/291;
(Continued)

(56) References Cited

U.S. PATENT DOCUMENTS

| 2,779,085 A | * | 1/1957 | Schoengarth | ........... B08B 7/022 173/51 |
| 4,641,510 A | | 2/1987 | Mitsching et al. | |
| 6,338,765 B1 | * | 1/2002 | Statnikov | ................. B23K 9/32 116/137 A |

FOREIGN PATENT DOCUMENTS

| AT | 58082 E | 4/1991 |
| DE | 1132510 B4 | 6/1962 |

(Continued)

OTHER PUBLICATIONS

DE102013207860.9, German Examination Report, dated Jan. 2, 2014.
PCT/DE2014/000175, International Search Report, dated Sep. 3, 2014.

*Primary Examiner* — Jermie Cozart
(74) *Attorney, Agent, or Firm* — Millman IP Inc.

(57) ABSTRACT

The invention relates to a pneumatic needling device for the local surface treatment, more particularly fastening, of components, comprising a first and a second needle (2) that can move in a needle direction; a first and a second piston chamber (3) for applying pneumatic pressure to the first and second needles in the needle direction; a pressure supply (1) that can be connected to and disconnected from the piston chambers, more particularly as a result of a movement of the needles in the needling device; a pressure recording means (5) for measuring pressure fluctuations in the piston chambers; and a control means (6) designed to carry out a reaction on the basis of the measured pressure fluctuations.

12 Claims, 1 Drawing Sheet

(51) Int. Cl.
*B25D 9/02* (2006.01)
*B23P 9/04* (2006.01)
*C21D 7/04* (2006.01)

(52) U.S. Cl.
CPC .. *B25D 2250/221* (2013.01); *B25D 2250/291* (2013.01); *C21D 7/04* (2013.01); *Y10T 29/49776* (2015.01); *Y10T 29/49778* (2015.01); *Y10T 29/5303* (2015.01); *Y10T 29/53039* (2015.01)

(58) Field of Classification Search
CPC .. B23P 9/04; B23P 19/04; Y10T 29/47; Y10T 29/49776; Y10T 29/49774; Y10T 29/49778; Y10T 29/59039; Y10T 29/5303
See application file for complete search history.

(56) References Cited

FOREIGN PATENT DOCUMENTS

| | | | |
|---|---|---|---|
| DE | 102010024892 A1 | 12/2011 | |
| EP | 2450155 A1 * | 5/2012 | ................ B23P 9/04 |
| WO | 2012016754 A1 | 2/2012 | |

* cited by examiner

PNEUMATIC NEEDLING DEVICE

The present invention relates to a pneumatic needling device for local surface treatment, in particular strengthening, of components, as well as a method for operating such a needling device.

A pneumatic needling device for local surface treatment, in particular strengthening, of components, is known from WO 2012 016754 A1.

In such needling devices, a plurality of needles is driven by alternating pneumatic pressurization in order to impinge on a component surface and to treat this surface similarly to a shot peening. Advantageously, needling devices of this type can be used for the surface treatment of components of turbomachines, in particular, blades or vanes of gas turbines.

Various disruptions can occur with such a treatment: for example, individual needles can jam, or cannot extend to the component surface due to a false positioning.

A method for adjusting the impact parameters of an impacting device driven by an incompressible fluid in which a piston is displaced is known from AT 58 082 E, wherein a pressure is measured in a chamber and compared with a reference pressure, and subsequently the fluid flow in a channel is adjusted as a function of this comparison.

An object of an embodiment of the present invention is to improve a surface treatment of components, particularly of turbomachines.

This object is achieved by a method having the features of claim 1 as well as a needling device having the features of claim 6. Advantageous embodiments of the invention are the subject of the dependent claims.

According to one aspect of the present invention, a pneumatic needling device for local surface treatment, in particular strengthening, of components has a first needle, which is movably mounted in a needle direction and can be pneumatically pressurized by a first piston chamber in order to expel it in its needle direction, in particular to accelerate it on a component surface. For this purpose, the first piston chamber can be alternately connected to and separated from an (over)pressure supply. In one embodiment, the first piston chamber is connected to the pressure supply and separated from this supply by a movement of the first needle in its needle direction. In particular, the first piston chamber can be or will be separated from the pressure supply when the first needle reaches or exceeds a predetermined needle stroke in its needle direction, and can be or will be connected to the pressure supply when or as long as the first needle has not reached or has gone below the predetermined needle stroke. Thus, in one embodiment, the retracted needle is expelled through the first piston chamber communicating with the (over)pressure chamber, and after striking the component surface, can retract, at least substantially, freely toward the first piston chamber. In one embodiment, the first needle forms a pilot plunger of a first slide valve for connecting and separating the pressure supply and the first piston chamber.

The needling device has a second needle, which is movably mounted in a needle direction and can be pneumatically pressurized via a second piston chamber in order to expel it in its needle direction, in particular to accelerate it on a component surface. The needle directions of the first and second needles can be parallel, at least substantially parallel. In one embodiment, the first and second needles are movably mounted mechanically independent of one another.

The second piston chamber can be alternately connected to and separated from an (over)pressure supply. In one embodiment, the second piston chamber is connected to the pressure supply and separated from it by a movement of the second needle in its needle direction. In particular, the second piston chamber can be or will be separated from the pressure supply when the second needle reaches or exceeds a predetermined needle stroke in its needle direction, and can be or will be connected to the pressure supply when or as long as the second needle has not reached or has gone below the predetermined needle stroke. In one embodiment, the second needle forms a pilot plunger of a second slide valve for connecting and separating the pressure supply and the second piston chamber. The pressure supply of the first and second piston chambers can be a common pressure supply. Likewise, the pressure supply of the first piston chamber and the pressure supply of the second piston chamber can be separate supplies.

Additionally, the needling device can have additional needles and piston chambers, which are constructed as explained above.

According to one aspect of the present invention, particularly either continuously or periodically, a first pressure fluctuation is determined in the first piston chamber and a second pressure fluctuation is determined in the second piston chamber. Correspondingly, according to one embodiment, the needling device has a pressure detecting means for determining a first pressure fluctuation in the first piston chamber and a pressure detecting means for determining a second pressure fluctuation in the second piston chamber. In one embodiment, the needling device has a common pressure detecting means for determining the first and the second pressure fluctuations. In another embodiment, the needling device has a first pressure detecting means for determining the first pressure fluctuation and a second pressure detecting means for determining the second pressure fluctuation. Additionally, the needling device can have additional pressure detecting means for determining additional pressure fluctuations in additional piston chambers.

In one embodiment, a pressure detecting means can have, or in particular can be, a pressure sensor. In one embodiment, the pressure detecting means communicates with the piston chamber via a borehole. In an enhancement, a pressure detecting means is disposed outside of the needling device, particularly to facilitate access. Additionally or alternatively, the pressure detecting means can communicate with the piston chamber via a borehole, which has at least the maximum length of the piston chamber, particularly at least double the length of the piston chamber, especially in order to filter or to smooth out pressure fluctuations.

In one embodiment, the one or more pressure detecting means is or are signally connected to a control means, which is equipped, particularly by programming, for conducting a method according to the present invention or for executing a response based on the determined first and/or second and/or additional pressure fluctuation(s).

Correspondingly, according to one aspect of the present invention, a response is conducted based on the determined first and/or second and/or additional pressure fluctuation(s).

A pneumatic pressure in a piston chamber fluctuates as a function of a movement or position of the needle that is acted on by the latter: for example, the (over)pressure of the (over)pressure supply in the piston chamber is applied, at least substantially, as long as or when this chamber is connected to the pressure supply. If the needle is expelled in the needle direction, the pressure in the piston chamber drops, especially when or as soon as the piston chamber is or will be separated from the pressure supply. By retracting the needle after it impinges on a component surface or also against a movement stop element in the needle direction, the pressure in the piston chamber can increase again, particularly when or as soon as the piston chamber is or will be connected to the pressure supply again.

Correspondingly, a movement of the needle acted on by a pressure fluctuation in the piston chamber can be determined, in particular examined and/or evaluated, based on this pressure fluctuation: for example, if the needle jams, a pressure fluctuation in the piston chamber acting on it becomes small (smaller).

Usually, the needles are expelled and retract periodically: after striking the component surface, they retract and are again expelled by the pressure supply. In this case, the frequency with which a needle is expelled and retracts depends on its free path length: the shorter the free path of the needle is to the component surface, the more rapidly it is repelled again. Correspondingly, a shorter path length of a needle correlates with a more frequent pressure fluctuation in the piston chamber acting on it. Therefore, particularly at a maximum pressure fluctuation frequency, it can be recognized that a needle has a maximum extension or an expulsion up to its stop element, without striking the component surface.

Thus, according to one aspect of the present invention, a response is conducted based on a determined pressure fluctuation. In one embodiment, the response can comprise, and particularly can be, an output, in particular an optical, acoustic and/or haptic message. In particular, a message can be output if it is detected on the basis of a determined pressure fluctuation that one or at least a predetermined number of needles does not carry out a stroke or only executes a negligible stroke, in particular it may be jammed. Additionally or alternatively, a message may be output when it is detected on the basis of a determined pressure fluctuation that one or at least a predetermined number of needles execute(s) a maximum stroke, in particular, may not strike the component surface.

Additionally or alternatively to a message, information based on a determined pressure fluctuation can be stored, particularly after being processed, preferably by filtering and/or integration. Thus, in one embodiment, a record of the movement of the needle(s) can be created to provide information on the surface treatment achieved.

Additionally or alternatively, a supply pressure can be modified on the basis of a determined pressure fluctuation. For example, if one or more needles jam(s), the pressure supply of the remaining needles can be correspondingly readjusted, in particular it can be reduced.

Additionally or alternatively, a position of the needling device can be modified on the basis of a determined pressure fluctuation. If, for example, one or more needles is expelled to the maximum extent without striking the component surface, the needling device can be repositioned, in particular it can be reoriented and/or can be disposed closer to the component surface, in particular by automatic adjustment of a stand in which the needles are mounted.

Therefore, in one embodiment of the present invention, a necessary response can be executed in a simple and/or reliable way based on determined pressure fluctuations. Correspondingly, in particular, a movement of the needle(s) can be monitored and/or recorded; optionally, a determined movement can also be responded to, particularly by messaging and/or readjusting the supply pressure and/or the position of the needling device.

As particularly results from the preceding explanation, in one embodiment, different responses can be executed as a function of a determined pressure fluctuation; for example, a maximum stroke or a jamming can be displayed if the frequency of pressure fluctuations exceeds a predetermined maximum value or goes below a predetermined minimum value.

In one embodiment, a determined pressure fluctuation may comprise, in particular may be, a vibration value, especially a frequency or period, with which a relative or absolute pressure or pressure value in the piston chamber changes, in particular goes below a predetermined minimum value, exceeds a predetermined maximum value, and/or goes below or exceeds a predetermined pressure difference. At the frequency level, this can be advantageously operated simply and/or reliably. In one embodiment, the pressure fluctuations, in particular vibration values, especially frequencies or periods, are processed in advance, in particular filtered and/or integrated, especially in order to filter out disruptive frequencies. For example, a striking of a needle on a component surface can induce a high-frequency pressure wave that in one embodiment is filtered out before a response is executed based on the thus determined, processed pressure fluctuation.

Additional advantageous enhancements of the present invention can be taken from the dependent claims and the following description of preferred embodiments. For this purpose and partially schematized:

Figure 1:
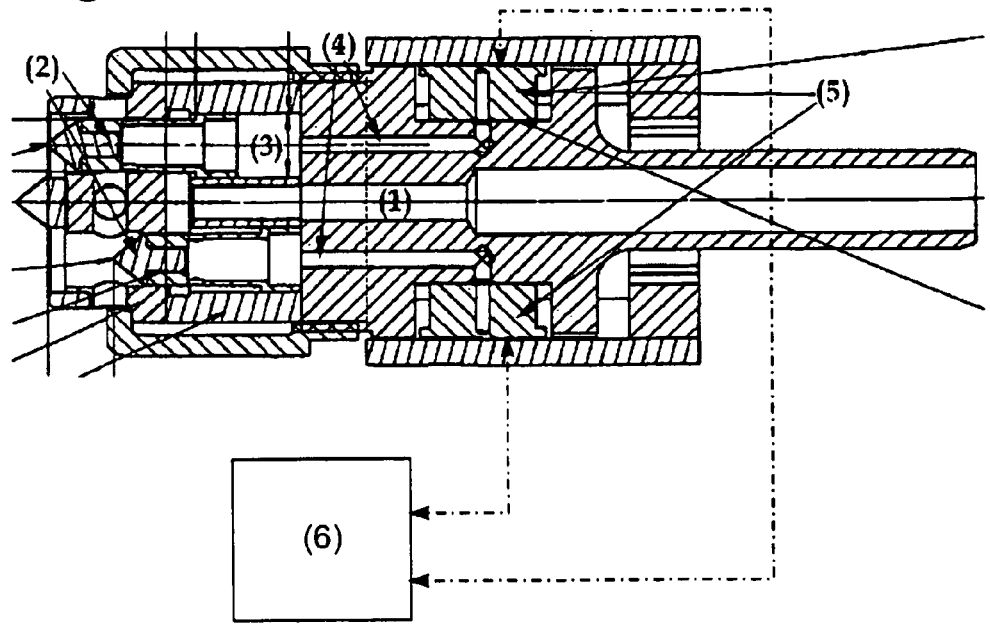
FIG. 1 shows a pneumatic needling device according to an embodiment of the present invention.

This device has a first needle 2 (top in FIG. 1) and a second needle 2 (bottom in FIG. 1), which respectively communicate with a first piston chamber 3 (top in FIG. 1) or a second piston chamber 3 (bottom in FIG. 1). The needling device can have analogously constructed additional needles and piston chambers (not shown).

In the case of the needle (bottom in FIG. 1) retracted in the needle direction (horizontal in FIG. 1), the piston chamber acting on this needle communicates with a common pressure supply 1. If the needle is expelled, in contrast, it closes a slide valve as a pilot plunger, and thus separates the piston chamber from the pressure supply (top in FIG. 1).

A dedicated pressure sensor 5 disposed on the outside of the needling device communicates with each piston chamber by means of boreholes 4, in order to determine a first or a second pressure fluctuation in the respective piston chamber. For signal connections, the pressure sensors 5, for example, are wired, connected wirelessly, or connected via a data bus to a control means in the form of a CPU 6, which executes a method explained below on the basis of FIG. 3.

Figure 2:
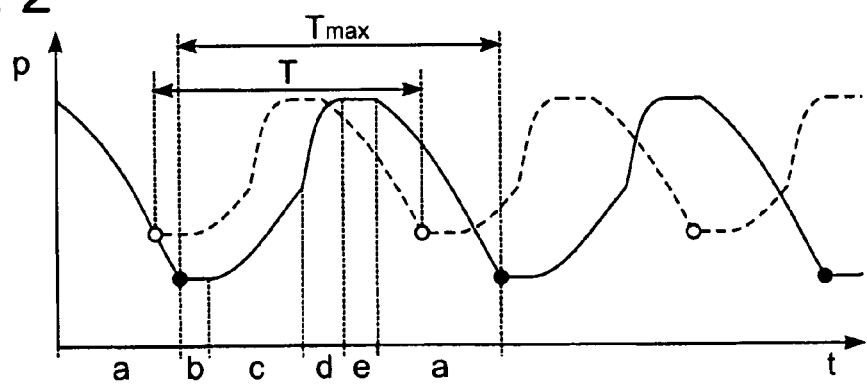
FIG. 2 shows pressure fluctuations in piston chambers of the needling device of FIG. 1.

FIG. 2 shows in a simplified manner the pressure fluctuations in the piston chambers 3 of the needling device of FIG. 1. A pressure course p over time t in a piston chamber, whose needle that is acted on by it does not strike a component surface, but extends up to a stop element (left in FIG. 1) is plotted by the solid line: in a first section a, the needle that is expelled enlarges the piston chamber and separates it from the common pressure supply, so that the pressure p decreases. In the following section b, the needle strikes the stop element; the pressure remains constant, at least substantially constant. Subsequently, the retracting needle decreases the piston chamber in a section c, so that the pressure p increases. In section d, the further retracting needle connects the piston chamber to the common pressure supply, so that the pressure p increases to its pressure level. This then expels the needle again, so that the pressure fluctuation is repeated cyclically.

Another pressure course p over time t in a piston chamber, whose needle acted on by it strikes the component surface, is plotted by the dotted line in FIG. 2. It is recognized that the reduction of the pressure is less pronounced, as a consequence of the shorter expulsion movement up to the impingement on the component surface. The same is true for the pressure increase as a consequence of the shorter retraction movement. Correspondingly, a period T between minimum pressure values (open circles in FIG. 2) in the case of a needle that strikes the component surface is shorter than a period Tmax between minimum values (filled circles in FIG. 2) in the case of a needle that does not strike a component surface, but rather is expelled up to the stop element.

Correspondingly, the CPU can determine whether a needle strikes the component surface or is maximally expelled based on the period duration (or likewise its reciprocal value or frequency f=1/T). In the same way also, a jamming needle can be recognized, for example, when the pressure in the piston chamber acting on the latter is at least substantially constant, or correspondingly, a period exceeds a limiting value, in particular tends toward infinity (at constant pressure).

Figure 3:
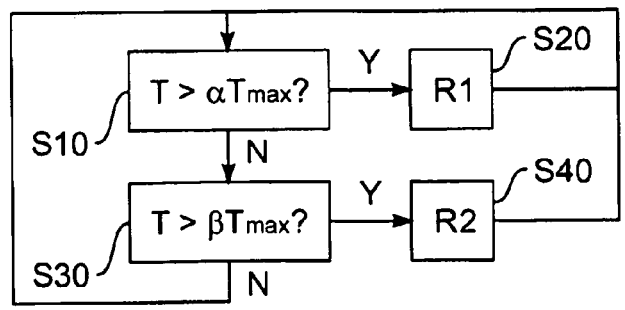
FIG. 3 shows a method according to an embodiment of the present invention for operating the needling device of FIG. 1.

For this purpose, FIG. 3 shows a method according to an embodiment of the present invention for operating the needling device of FIG. 1, as it is executed by the CPU 6.

In a step S10, the CPU determines a period T of a pressure fluctuation for each piston chamber 3. For this purpose, for example, as indicated in FIG. 2, it determines the time period between two sequential minimum pressures in the respective piston chamber. Likewise, it can also determine, for example, a period between an exceeding of a predetermined pressure difference, in particular a current piston chamber pressure at a pressure level of the pressure supply 1, and a repeated exceeding of this pressure difference.

Then in step S10, the CPU examines for each piston chamber whether the determined period is greater than a predefined value $\alpha T_{max}$, where a can be 2, for example. Therefore, the CPU recognizes whether a needle needs at least twice as long for retraction and expulsion as it does in the case of a free expulsion up to the stop element. From this, the CPU can conclude that the needle is probably jammed. If the needle hardly moves, the period duration T in fact tends toward infinity (T>>$\alpha T_{max}$). In this case (S10: "Y"), the CPU executes a first response R1 in step S20. For example, the CPU can emit a warning signal and/or regulate the common pressure supply accordingly, in order to compensate for the lower pneumatic consumption and to consistently act on the remaining needles.

If the determined period duration T does not exceed the value $\alpha T_{max}$, which is explained above and which signals a jamming of the needle (S10: "N"), it continues with step S30, in which it examines for each piston chamber whether the determined period exceeds another predetermined value $\beta T_{max}$ where β can be 0.95, for example. Thus, the CPU recognizes whether a needle has at least 95% of the maximum period duration that results in the case of a complete expulsion, and taking into consideration a certain tolerance, can conclude from this that the needle has probably not impacted the component surface (S30: "Y"). In this case, the CPU executes a second response R2 in step S40. For example, the CPU can adjust the needling device by a motor in a stand (not shown) in the needle direction (toward the left in FIG. 1), in order to shorten the path to the component surface. Otherwise (S30: "N"), a response is not produced by the CPU Pressure fluctuations detected by pressure sensors 5 in the piston chambers 3 are already fluidically somewhat filtered or smoothed via the boreholes 4. Additionally or alternatively, the CPU can process the detected pressure fluctuations before it triggers a response as a function of the processed pressure fluctuations. For example, it can filter the detected pressure fluctuations, carry out a Fourier transform, or the like. Advantageously, in this way, higher frequencies that are imparted, for example, as a consequence of striking a component surface, can be filtered out.

Although exemplary embodiments were explained in the preceding description, it shall be noted that a plurality of modifications is possible. In addition, it shall be noted that the exemplary embodiments only involve examples that in no way shall limit the scope of protection, the applications, and the construction. Rather, guidelines are given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

LIST OF REFERENCE CHARACTERS

1 Pressure supply
2 Needle
3 Piston chamber
4 Borehole
5 Pressure sensor
6 CPU (control means)
T Period
P Pressure/Pressure course
t Time
a-e Section
R1, R2 Response

The invention claimed is:
1. A method for operating a pneumatic needling device for local surface treatment, including strengthening, of components, having a first needle (2), which is movable in a needle direction;
a first piston chamber (3) for the pneumatic pressurizing of the first needle in its needle direction;
a pressure supply (1), which can be connected to and separated from the first piston chamber, by a movement of the first needle in its needle direction;
a pressure detecting means (5) for determining a first pressure fluctuation in the first piston chamber;
a second needle (2), which is movable in a needle direction;
a second piston chamber (3) for the pneumatic pressurizing of the second needle in its needle direction;
a pressure detecting means (5) for determining a second pressure fluctuation in the second piston chamber;
a pressure supply (1), which can be connected to and separated from the second piston chamber, by a movement of the second needle in its needle direction; and
a control means (6),
wherein the method comprises the steps:
determining (S10) the first pressure fluctuation in the first piston chamber (3);
determining (S10) a second pressure fluctuation in the second piston chamber (3); and executing (S20, S40) a response (R1, R2) based on the determined first and/or second pressure fluctuation.

2. The method according to claim 1, further characterized in that the response comprises an output of a message (S20), a storing of information and/or a change in a supply pressure (S20) and/or a position of the needling device (S40).

3. The method according to claim 2, further characterized in that the response (R1, R2) is executed (S20, S40) when the determined first and/or second pressure fluctuation exceeds or goes below a predefined value ($\alpha T_{max}$, $\beta T_{max}$).

4. The method according to claim 1, further characterized in that different responses (R1, R2) are executed as a function of the determined first and/or second pressure fluctuation.

5. The method according to claim 1, further characterized in that the determined first and/or second pressure fluctuation comprises a vibration value, including a frequency (1/T) or a period (T).

6. The method according to claim 5, further characterized in that a response (R1, R2) is executed (S20, S40) when the determined first and/or second pressure fluctuation exceeds or goes below a predefined value ($\alpha T_{max}$, $\beta T_{max}$).

7. A pneumatic needling device for local surface treatment, in particular strengthening, of components, having
  a first needle (2), which is movable in a needle direction;
  a first piston chamber (3) for the pneumatic pressurizing of the first needle in its needle direction;
  a pressure supply (1), which can be connected to and separated from the first piston chamber, by a movement of the first needle in its needle direction;
  a pressure detecting means (5) for determining a first pressure fluctuation in the first piston chamber;
  a second needle (2), which is movable in a needle direction;
  a second piston chamber (3) for the pneumatic pressurizing of the second needle in its needle direction;
  a pressure detecting means (5) for determining a second pressure fluctuation in the second piston chamber;
  a pressure supply (1), which can be connected to and separated from the second piston chamber, by a movement of the second needle in its needle direction; and
  a control means (6), which is set up to execute (S20, S40) a response (R1, R2) based on the determined first and/or second pressure fluctuation.

8. The pneumatic needling device according to claim 7, further characterized in that the response comprises an output of a message (S20), a storing of information, and/or a change in a supply pressure (S20) and/or a position of the needling device (S40).

9. The pneumatic needling device according to claim 8, further characterized in that the control means is equipped for the purpose of executing (S20, S40) a response (R1, R2) when the determined first and/or second pressure fluctuation exceeds or goes below a predefined value ($\alpha T_{max}$, $\beta T_{max}$).

10. The pneumatic needling device according to claim 7, further characterized in that the control means is equipped for the purpose of executing different responses (R1, R2) as a function of the determined first and/or second pressure fluctuation.

11. The pneumatic needling device according to claim 7, further characterized in that the determined first and/or second pressure fluctuation comprises a vibration value, including a frequency (1/T) or a period (T).

12. The pneumatic needling device according to claim 11, further characterized in that the control means is equipped for the purpose of executing (S20, S40) a response (R1, R2) when the determined first and/or second pressure fluctuation exceeds or goes below a predefined value ($\alpha T_{max}$, $\beta T_{max}$).

* * * * *